United States Patent
Castellanos Suarez et al.

(10) Patent No.: US 6,524,367 B1
(45) Date of Patent: Feb. 25, 2003

(54) HYDROMETALLURGICAL PROCESS FOR THE RECOVERY OF NICKEL AND COBALT BY AMMONIACAL LEACHING

(75) Inventors: Jose Castellanos Suarez, C. Habana (CU); German A. Alvarez Villanueva, C. Habana (CU); Ana Maria De La Cruz Fuxa, Holguin (CU); Pilar Martin Gonzalez, Holguin (CU); Isabel Lobaina Urtafe, Holguin (CU); Oscar Perez Laurencio, Holguin (CU); Milagros Escalona Rodiguez, Holguin (CU)

(73) Assignee: Centro de Investigaciones Para la Industria Minero-Metalurgcia (CIPIMM) (CU)

( * ) Notice: Subject to any disclaimer, the term of this patent is extended or adjusted under 35 U.S.C. 154(b) by 0 days.

(21) Appl. No.: 09/194,043

(22) PCT Filed: Feb. 6, 1998

(86) PCT No.: PCT/CU98/00002
§ 371 (c)(1),
(2), (4) Date: Jun. 1, 2001

(87) PCT Pub. No.: WO98/37247
PCT Pub. Date: Aug. 27, 1998

(30) Foreign Application Priority Data

Feb. 18, 1997 (CU) .................................................. 21/97

(51) Int. Cl.⁷ ................................................ C22B 3/14
(52) U.S. Cl. ...................................... 75/425; 423/150.1
(58) Field of Search .................. 75/424, 425; 423/150.1

(56) References Cited

U.S. PATENT DOCUMENTS

| | | | |
|---|---|---|---|
| 2,616,781 A | 11/1952 | Forward | |
| 3,100,700 A | 8/1963 | Hills | |
| 3,644,114 A | * 2/1972 | Vosahlova et al. | 423/150.4 |
| 3,860,689 A | * 1/1975 | Sefton et al. | 423/150.5 |
| 3,929,468 A | 12/1975 | Siemens et al. | |
| 4,312,841 A | 1/1982 | Tolley et al. | 423/150 |
| 4,361,541 A | 11/1982 | Bings et al. | 423/20 |
| 4,472,359 A | 9/1984 | Pietsch et al. | |

FOREIGN PATENT DOCUMENTS

FR 78 05540 2/1978

* cited by examiner

Primary Examiner—Roy King
Assistant Examiner—Tima McGuthry-Banks
(74) Attorney, Agent, or Firm—Lackenbach Siegel, LLP

(57) ABSTRACT

The present is a hydrometallurgical procedure for nickel and cobalt recovery, which involves leaching with ammonia-ammonium carbonate solution of the nickel and cobalt bearing mineral material, using a tubular reactors aid mineral material is previously submitted to processes such as selective reduction, cooling, new ammonia leaching, liquid/solid separation and/or nickel and/or cobalt extraction by solvent or ion-exchange resin, allowing the recovery of all the extractable nickel and up to the 130% cobalt extraction reported by the standard ammonia-ammonium leaching.

20 Claims, 3 Drawing Sheets

HYDROMETALLURGICAL PROCESS FOR THE RECOVERY OF NICKEL AND COBALT BY AMMONIACAL LEACHING

TECHNICAL SECTOR

This invention is related to non-ferrous hydrometallurgy and can be used in those plants wherein nickel and cobalt ores, concentrates and intermediate products are treated by the ammonia-ammonium carbonate technology, after the previous nickeliferous ore direct reduction (Nicaro, Punta Gorda, Queensland Nickel, Marinduque plants, among others), or in plants newly constructed. A more specific application could also be to the processing of intermediate products or nickel and cobalt concentrates amenable to leaching by an ammonia-ammonium carbonate solution.

PRIOR ART

The Northamerican Patent No. 1847145, dated Mar. 18, 1924, Author: M. H. Caron, establishes the selective reduction with respect to iron, leaching of the reduced ore with ammonia-ammonium carbonate solution, countercurrent washing of the leached pulp in thickeners, the optional removal of cobalt in the form of sulphide, distillation of the pregnant liquor or solvent extraction. The final product may be nickel metal (briquette, powder, oxide) Class I or II, cobalt metal (powder, salts, sulphides), among others.

The known procedure comprises ore grinding to 80–85% $-74 \mu m$, either mixed with 2–4% petroleum, or reduction by a reducing gas ($CO+H_2$) in a multi-hearth furnace. Both the atmosphere and temperature inside the furnace are controlled to attain a high reduction of nickel and cobalt and a very low one of iron. Generally, nickel is metallized up to 95–98%, and cobalt to 75–80%, which is further extracted by ammonia leaching. High metallic iron contents prevents the process to develop satisfactorily, due to the heat released during its oxidation and, consequently, the pulp runs hot in 10–12° C., thus requiring to be cooled, as well as the liquor, in such a magnitude.

The formation of $Fe(OH)_3$ throughout this procedure, arises nickel (1–5%) and cobalt (20–40%) losses because of their readsorption on the precipitate. At Queensland Nickel this is a single-stage process carried out in a bank of large turboaerators, at a high ammonia concentration (95 g/L against 60–65 g/L $NH_3$ at Nicaro), whereby nickel and cobalt losses were reduced in 0.5% and 15–20, respectively.

In the traditional process leaching is performed for 1.5–3 hours, and a considerable number of turboaerators is required (i.e. 66 turboaerators at Punta Gorda in the Cuban plants, and 12 huge turboaerators for Queensland), thus implying high energy, ammonia, and air consumption and maintenance costs for both cases.

Traditional process at low ammonia concentrations generally includes three stages: each of these stages includes leaching in turboaerators with liquid/solid separation in a thickener.

Liquid/solid separation generally takes 1 or 2 days, and arises metal losses due to their coprecipitation and readsorption on iron hydroxide and manganese oxides.

Throughout said process cobalt is partly precipitated between the first and second stage, either using ammonium hydrosulphide or sodium sulphide (or $H_2S$). The nickel-rich liquor is subjected to distillation to produce basic nickel carbonate, and nickel of different qualities is then obtained as final product.

At Queensland, the nickel and cobalt-rich product liquor with high ammonia contents (90–95 g/L) is removed, nickel by solvent extraction and the cobalt-rich liquor (raffinate) is precipitated by ammonium hydrosulphide. The final product is a combined sulphide rich in cobalt ($Co:Ni \geq 40:1$). The final product is nickel Class I and cobalt sulphide. Solvent LIX with selectivity for nickel is used in this process.

At Tocantis, nickel and cobalt are precipitated by distillation, and the combined carbonate (Ni+Co) is dissolved in sulphuric acid, pure metals being further removed by solvent extraction.

On the other hand, most of the laterite nickel ores exhibits a magnesium content relatively high, and are not treated by pressure acid leaching at high temperature, mainly because it is unprofitable, requires costly investments for magnesium oxide removal and recycling, and also due to the build up of large crusts on the plant circuit.

The present invention is aimed to develop a hydrometallurgical extraction procedure for the intensive leaching of nickel and cobalt-bearing ores in a lesser time than the traditional process, capable of providing an operation at a low ammonia concentration, and leaching all the extractable nickel, as well as all the cobalt leached and coprecipitated together with iron hydroxide.

Another objective envisaged to the invention is the reduction of investment cost and production costs as to supplies, ammonia, energy and maintenance, and also to facilitate the complete automation of the leaching process.

An additional goal of the invention includes the development of a hydrometallurgical extraction procedure for the intensive leaching of concentrates or intermediate products containing nickel and cobalt in a soluble form in ammonia solutions.

A hydrometallurgical procedure for nickel and cobalt recovery by the intensive leaching of ores, concentrates or intermediate products, which involves the basic stages and other additional ores, constitutes a novelty of the invention.

The basic stages are:

a. The material—a nickeliferous ore bearing 0.5–3% nickel, 0.005–1.5% cobalt and 10–55% iron—is submitted to a selective reduction process at a temperature range between 540 and 580° C., using a reducing agent.

b. The material which can be an intermediate product or a nickel and cobalt concentrate, wherein the metals contained (Ni and Co) are soluble in ammonia solutions, and a previous reduction is not necessary.

c. Reduced ore is cooled in the presence of reducing or inert gases.

d. Reduced ore or the nickel and cobalt intermediate product or concentrate is brought into contact with an ammonia-ammonium carbonate solution, in such a way that pulp temperature does not exceed 60° C.

e. Pulp is leached in a tubular reactor to which air or oxygen is injected over a leaching time between 5 seconds and 15 minutes, with a high oxygen adsorption.

f. Pulp is cooled in the tubular reactor, where temperature just increases from 1 to 6° C.

The procedure herein proposed gives solution to two fundamental problems: firstly, it allows a more effective reduction of the leachable nickel and cobalt up to 80–90% (Ni) and 70–80% (Co), and, second, iron metallization stops to be a limiting factor.

The mineral ground $-74 \mu m$ in a 60–90%, is reduced by a reducing gas with 2–50% ($CO+H_2$), or by a mixture of a reducing gas and additive petroleum (0.5–4.5% by weight), or petroleum alone as reducing agent, which requires about 5–90 minutes. The mineral is cooled at a temperature of 130–280° C.

When leaching is performed at low ammonia concentrations (60–65 g/L) and $CO_2$ (30–35 g/L) likewise to the traditional process, nickel and cobalt recovery is increased in 2–6% and 30–40%, respectively. Heat release is offset by pulp self-cooling, resulting in just an increment of 3–4° C.

This procedure practically eliminates 75–90% of the turboaerators, performance time is below 15 minutes, and operates at low ammonia concentrations, although it is also possible to operate at high concentrations. Consequently, the cost relative to investment and air, ammonia, energy consumptions and maintenance are lowered, and besides offers the possibility of a complete automation.

An advantage of the invention is that iron oxidation to oxide takes place quickly, thus iron hydroxide formation is reduced and, hence, metal losses.

The procedure object of the invention behaves more efficiently in comparison to the traditional one even though at a $NH_3$ concentration below 60 g/L, which is not observed in the latter. On the other hand, our procedure involves the flash separation of the solid from the pulp, using hydrocyclones, whether combined or not with a thickener, or a high-productivity thickener, thus reducing Ni and Co losses.

The procedure as shown in FIG. 1—the reduced ore from the ore cooler is mixed with recycling liquor (1) containing ammonia (30/120 g/L–30/80 g/L $CO_2$) and $CO_2$ or ammonium sulphate liquor and ammonia at equal ammonia concentrations, and a Ni concentration (up to 13 g/L) and Co (up to 0.5–0.69 g/L) in a duct going to the contact tank (2); pulp temperature is below 60° C. and density is in the range of 1050 and 1250 g/L. The pulp passes through the tubular reactor by means of a pump (3) at a spatial rate between 0.5 and 29 m/s; an air flow or other oxidant is injected to the reactor at a spatial rate between 0.25–15 m/s.

The pulp is discharged into a thickener (6) for liquid/solid separation, a part of the pregnant liquor rich in Ni and Co is passed through the liquor coolers (7) to the duct or contact tank (1), and the other one is sent to Ni and Co separation (8). The thickener underflow (9) can be submitted to a second leaching stage, if necessary, or to a countercurrent washing system (CCD) for the reextraction of 0.5–10% nickel and 2–25% cobalt contained in the solid.

The outlined method comprises one or various additional stages as to leaching, liquid/solid separation, solvent or resin extraction which allow to increase the metallurgical efficiency of the process (nickel and cobalt recovery), and to reduce investments for using less equipment.

The relative efficiency of Ni and Co adsorption is 99–100%. Desorption is performed in a column (9), where the resin is placed. The eluting solution having 40–140 g/L $NH_3$ and 70–100 g/L $CO_2$ (10) is pumped to the column at a flow rate of 2 vols./vol. of resin/hr., passing through the resin from bottom to top. For a typical volume of 9 volumes of resin bed, all the nickel and cobalt is extracted with an efficiency of 99%. The rich solution goes to nickel and cobalt separation. For this process, a chelate weakly acid resin with a functional group ($SO_2H$), or resins exhibiting similar properties are recommended.

Figure 2A:
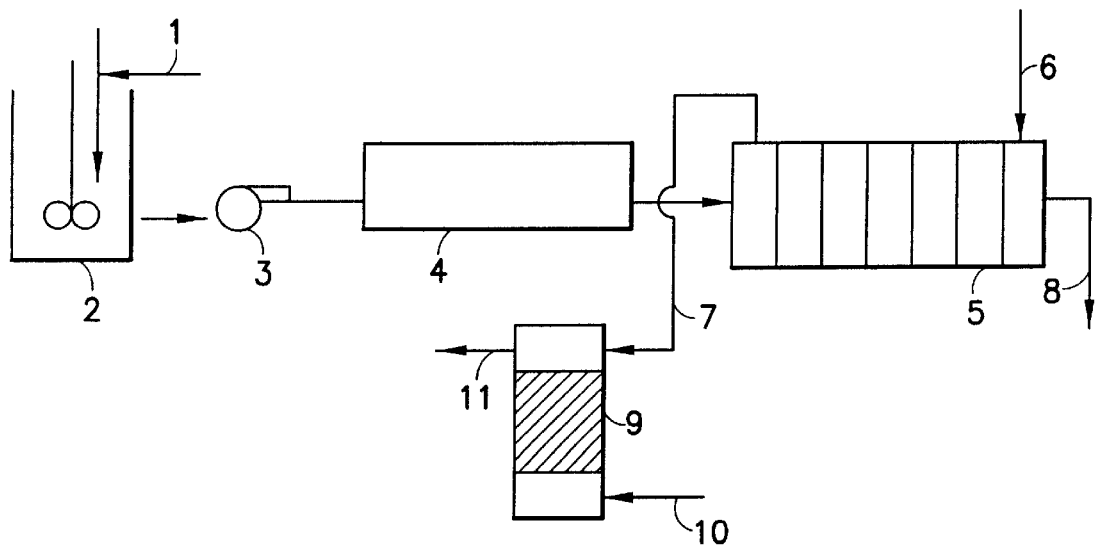
FIGS. 2(a) (b) includes nickel and cobalt extraction by a ion-exchange resin.
Figure 2B:
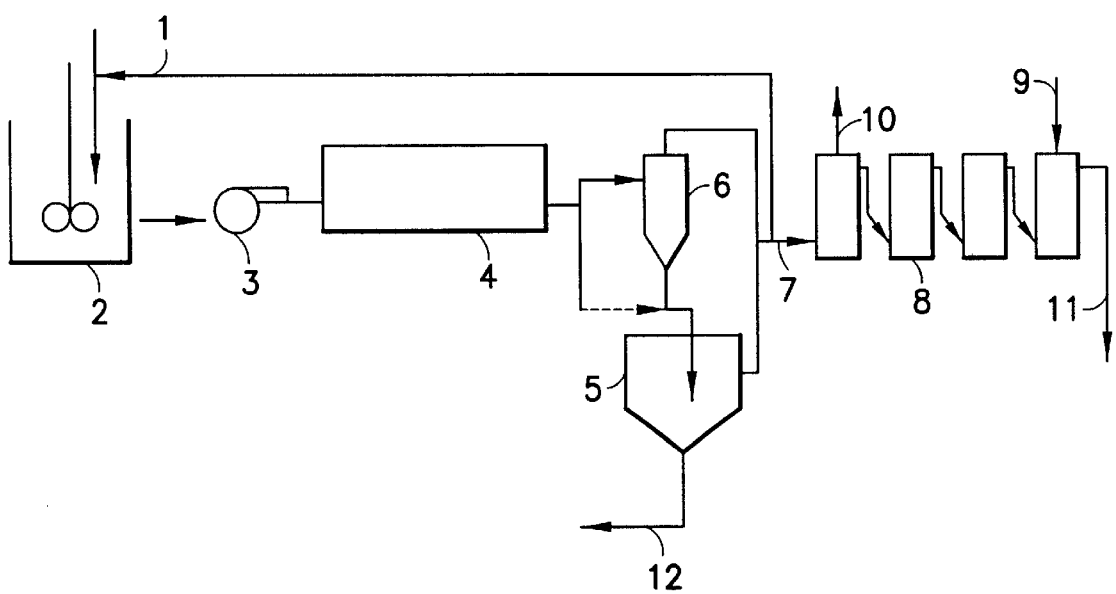
FIG. 2 shows the diagrammatic form of the process. 2a shows the reduced ore mixed with the ammonia liquor (1) entering the contact tank (2) wherefrom it is pumped (3) to a tubular reactor (4), at a pressure between 1.5–10 Bar, where nickel and cobalt are leached, passing later to a bank of contactors (pulp-resin) (5). The pulp and the ion-exchange resin travels together upstream. The Ni and Co-free resin (b) is fed to the last reactor, and the resin loaded with the metals (7) is drawn from the first reactor, passing to the desorption column (9). Resin is washed before desorption. Final tailing (8) free from soluble nickel and cobalt goes to the distillation stills for ammonia and $CO_2$ recovery.

FIG. 2b shows the pulp pumped (3) from the contact tank (2) to the tubular reactor (4) wherein leaching is carried out. The leached pulp goes to liquid/solid separation (hydrocyclones (6), thickener (5), or a thickener alone). The pregnant liquor (7) (rich in Ni and Co) is partly sent to the contact tank and the other part to a bank of 4–6 columns (8) loaded with a ion-exchange resin. Liquor and resin travel together upstream. The resin free from Ni and Co (9) is loaded to the last column, which moves periodically from said column toward the first one. The loaded resin is drawn from this column (10) and goes to desorption, (FIG. 2a, (9)).

FIG. 3 presents some combined alternatives to enhance the invention procedure.

Figure 1:
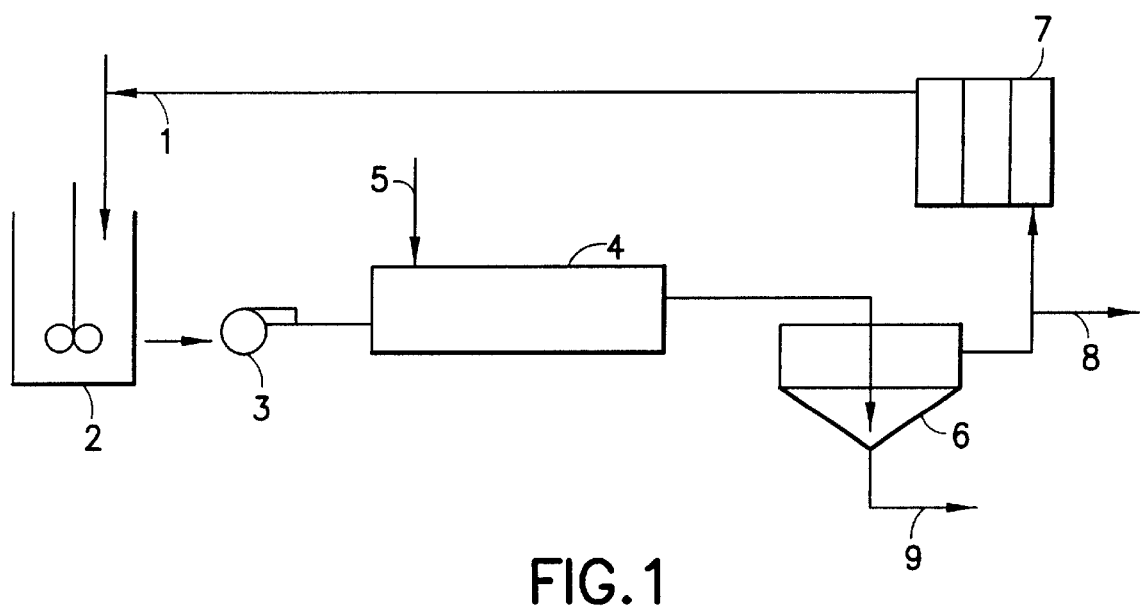
FIG. 1 shows the flow sheet for the present process.
Figure 3A:
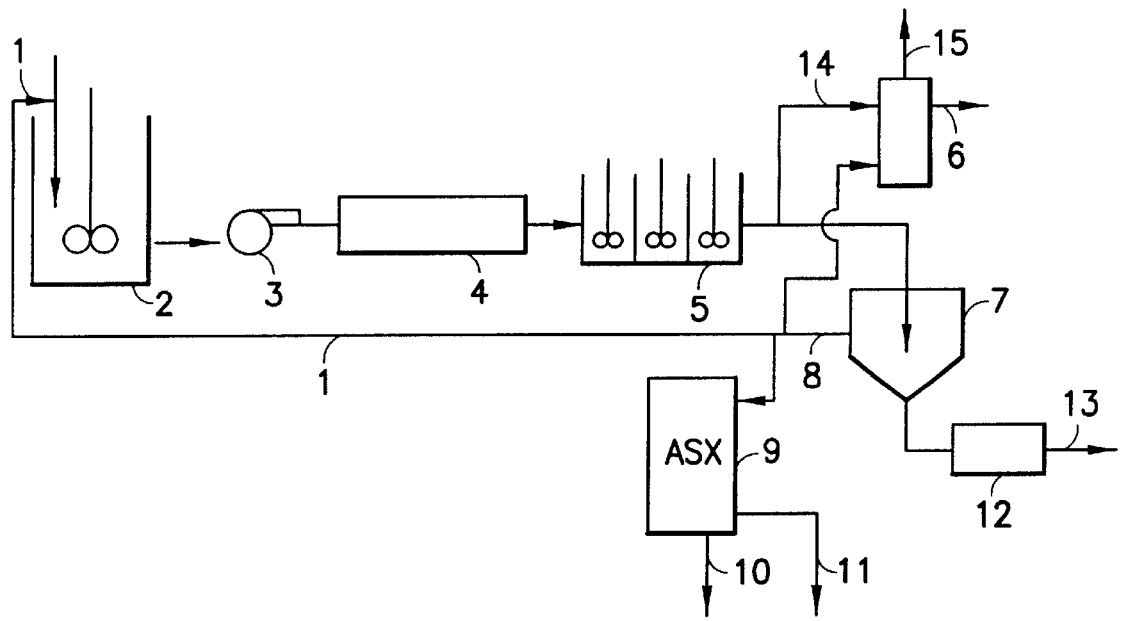
FIG. 3a shows alternatives of combined processes with different additional stages, including nickel and cobalt separation by resins or solvents.

FIG. 3a shows the reduced ore mixed with ammonia liquor (1) entering the contact tank (2). The pump (3) feeds the pulp to the tubular reactor (4), which operates under the conditions described in FIG. 1. The leached pulp goes to the bank of turboaerators (5). The pulp passes to a stage consisting in a bank of contactors loaded with a ion-exchange resin (similar to that described in FIG. 2a). Another alternative would be to send the pulp to a liquid/solid separation stage (6).

A part of the pregnant liquor is cooled and mixed with the reduced ore (1). The rest of the rich liquor (Ni and Co)(8) can be stripped in a set of columns loaded with resins (7) (similar to that described in FIG. 2b), or sent to ammonia solvent extraction (ASX) (9) selective for cobalt, and the pure stream of nickel ammonia liquor (11) is sent to distillation to obtain nickel carbonate, and from the same, nickel Class I. Cobalt (10) is processed to obtain metallic cobalt or its pure salts.

Tailings from the thickener (6) are sent to a tubular reactor (12) for a second leaching or washing stage under parameters similar to those described for the reactor (4).

Figure 3B:
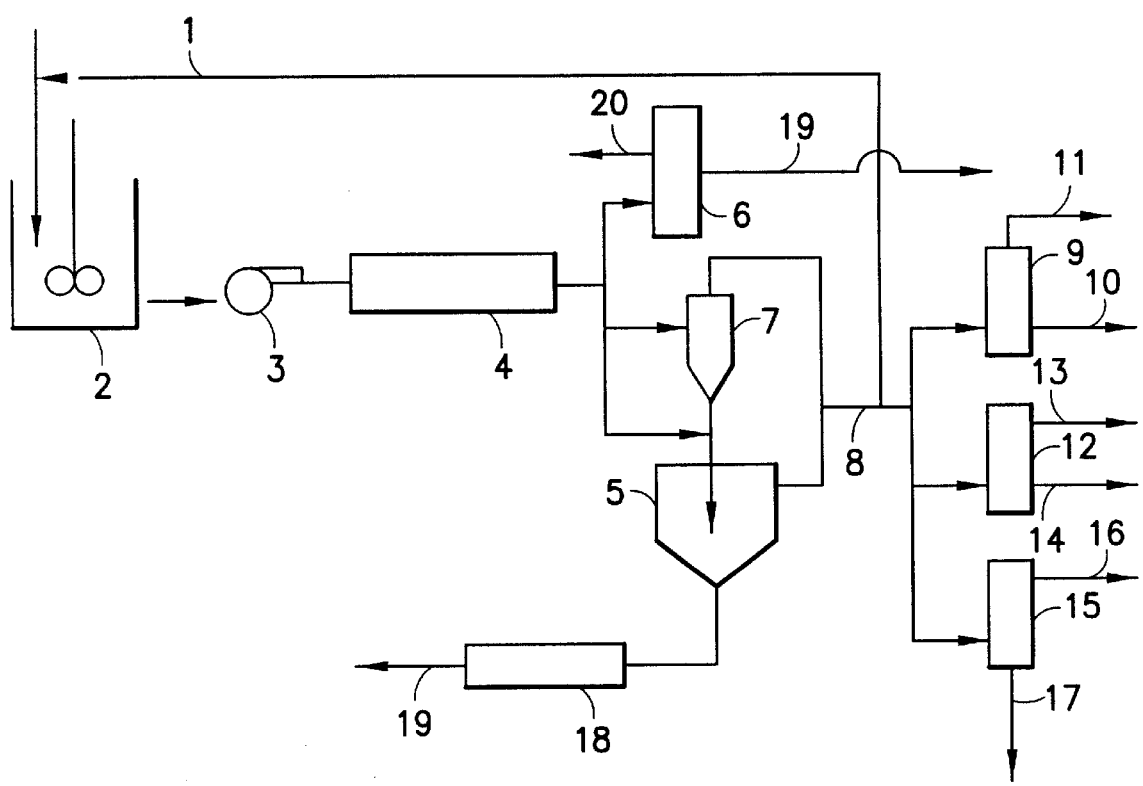
FIG. 3b comprises pulp separation applying hydrocyclones with a high—productivity thickener, or the latter alone.

In FIG. 3b can be observed the reduced ore and ammonia liquor (1) entering the contact tank (2). A pump (3) sends them to the tubular reactor (4). The leached nickel and cobalt are either stripped by the resin-in-pulp process (5), as described in FIG. 2a, or the leached pulp is sent to liquid/solid separation (using hydrocyclones (7) combined with a thickener (6), or a thickener alone (6)).

The pregnant liquor (rich in Ni and Co)(8) is treated by one of the three stages: using ammonium hydrosulphide, hydrogen sulphide or sodium sulphide (9) yielding a cobalt separation between 40–95% to produce a combined sulphide (Ni:Co=2:1) to 4:1 (10). The liquor rich in nickel (and poor in cobalt (11) goes to distillation to obtain nickel carbonate and a final product Class I or II.

There is another alternative wherein the liquor is sent to a bank of 4–6 columns (12) loaded with a ion-exchange resin. The resin loaded with Ni and Co, or selective for one of these metals, as described in FIG. 2b. As the third alternative appears the extraction of nickel and cobalt by an ammonia solvent (15) selective for nickel, and the distillation of the cobalt refined solution (16) to produce high-purity cobalt hydroxide, or the precipitation of the cobalt liquor using ammonium hydrosulphide ($H_2S$, $Na_2S$) to obtain a mixed cobalt sulphide (Co:Ni≧40:1). The final product would be Nickel Class I and mixed cobalt sulphide.

If the solution were treated with a solvent for cobalt, the nickel-rich liquor would be sent to distillation in order to achieve a pure basic nickel carbonate. The final product would be nickel Class I. Cobalt is separated as metal or its pure salts.

The present invention proposes a simpler flowsheet for metal extraction from a solution with low ammonia concentrations (60–65 g/L). Cobalt is extracted (90–95%) with a solvent of the type LIX DEPPA, or any other selective for this metal, and nickel is obtained by the process of distillation-calcination and reduction. The final product is nickel Class I.

The process of extraction by ammonia solvent (ASX) is performed using a solvent selective for cobalt (or nickel), which allows the extraction of cobalt (Co:Ni or Ni:Co≧400:1), and the final product would be metallic cobalt or its salts. Nickel liquor is distilled, and the final product is nickel (99.5%). A solvent selective for nickel can also be used, and the raffinate bearing cobalt is treated by ammonium hydrosulphide to obtain a mixed cobalt sulphide (Co:Ni≧40:1).

| Caron Process |
| --- |
| Reduction   Leaching |
| ASX   Cobalt (Co:Ni ≧ 400:1) |
| Extraction by ammonia solvent |
| Distillation (basic nickel carbonate) |
| Calcination |
| Reduction |
| High-grade nickel (99.5%) |

EXAMPLES

1(a) An ore bearing 1.26% Ni, 0.099% Co and 39.2% Fe ground below one millimeter (60% −74 μm) is mixed with 1.5% additive petroleum in a ball mill.

The mineral is reduced at a temperature of 715° C. for a total time of 60 min., and at the maximum temperature for 15 minutes. The concentration of the reducing gases inside the furnace was 12% Co and 6% $CO_2$.

Reduced ore was cooled at room temperature.

The ore was brought into contact with an ammonia liquor having 65 g/L $NH_3$ and 35 g/L $CO_2$ in a tubular reactor (see diagram 3).

Pulp flow rate was 250 cc/min., and air, 8 L/mm.

Total time for treatment was 15 minutes. An ore sample was submitted to the standard ammonia leaching in order to know the extractable nickel and cobalt.

| | Results | |
| --- | --- | --- |
| | Standard Leaching, (QT) | Tubular Leaching (relative extraction, %) |
| Nickel | 84 | 99 |
| Cobalt | 60 | 110 | b.—Reduced ore was leached likewise (a), but the solid was rapidly separated by filtration, having attained the following results:

| | Relative Extraction, % | |
| --- | --- | --- |
| | Separation by thickening | Flash Separation |
| Nickel | 99 | 100 |
| Cobalt | 110 | 120 |

EXAMPLE 2

An ore sample bearing 1.48% Ni, 0.12% Co, and 45% Fe was reduced at a temperature of 730° C. for 30 min., using a reducing gas containing 26% CO, 16% $H_2$ and 3% $CO_2$. Ore reduced was leached in a tubular reactor for 4 minutes. Air consumption was 100 $m^3$ N/t mineral.

Ammonia concentration in the liquor was 90 g/L, and $CO_2$, 45 g/L.

The pulp was submitted to filtration. The results were as follows:

Relative extraction, from standard leaching, %

| Ni | Co |
| --- | --- |
| 102 | 132 |

EXAMPLE 3

A sample of reduced ore was taken at the industrial furnace outlet, whose composition was 1.40% Ni, 0.13% Co, 50.3% Fe, and 1.5% metallic Fe.

The ore was leached in a tubular reactor using a liquor having 65 g/L $NH_3$ and 35 g/L $CO_2$, and 8 g/L Ni. Pulp was filtered and the solid washed with ammonia solution.

Results attained were:

Relative Extraction, %

| Ni | Co | Retention Time |
| --- | --- | --- |
| 98 | 104 | 1.5 min. |

EXAMPLE 4

A sample of reduced ore (under the conditions relative to example 1), whose composition was: 1.39% Ni, 0.112% Co, 55.4% Fe and 3.0% metallic Fe.

Ore was mixed with a solution containing 50 g/L $NH_3$ and 30 g/L $CO_2$, being leached in a tubular reactor at a flow rate of 300 cc pulp/min. and 10 L/min. air Leached pulp was fed upstream to 6 stages provided with ion-exchange resin type PSO.

Standard leaching was performed in tank using a solution containing 170 g/L $NH_3$, 70 g/L $CO_2$, for 2 hours with air injection, stirring mechanically. A recovery of 81% Ni and 60.3% cobalt was attained over this test.

The conditions established were:

Number of stages: 8

Contact time/stage: 20 min.

Volumetric ratio of pulp-resin flow:

| Results | Recovery, % | |
|---|---|---|
| | Ni | Co |
| Standard leaching | 81.5 | 60.3 |
| Recovery by resin | 82.3 | 63.0 |
| Resin load | | |
| Ni | 21.6 g/L resin | |
| Co | 0.28 g/L resin | |

EXAMPLE 5

A pulp sample was taken directly from the contact tank of the industrial plant.

The pulp was leached in the isolated tubular reactor, at a flow of 20 L/min. and an air consumption of 90 $M^3$ N/t reduced ore.

| The main indexes were: | | |
|---|---|---|
| | Recovery, % | |
| | Ni | Co |
| Standard leaching, Ni and Co recovery | 80.5 | 57.3 |
| Leaching at the industrial plant (traditional process) | 76.0 | 22.0 |
| Leaching in the tubular reactor | 77.2 | 60.1 |
| Temperature increase in the leached pulp | | |
| (a) Industrial Plant | 11.5° C. | |
| (b) Tubular Reactor | 4° C. | |

EXAMPLE 6

The liquor from the leaching at the tubular reactor, containing 11 g/L Ni and 0.23 g/L Co, was treated using ammonium hydrosulphide in a stoichiometric quantity to separate 60% cobalt.

The precipitate was filtered and analized. Ni:Co ratio was 2:1. When cobalt separation increased to 80%, Ni:Co ratio leached 5:1.

A second sample of reduced ore was leached using the low-cobalt liquor, and cobalt recovery increased in 3%.

EXAMPLE 7

A sample of the nickel and cobalt-rich liquor from the example 6 was submitted to solvent extraction using a solvent selective for cobalt.

Cobalt was separated by the solvent, having obtained a raffinate and a cobalt final product with a Co:Ni ratio=400:1. The liquor rich in nickel and low in cobalt was used to leach a sample of the reduced ore taken at the outlet of the industrial furnace. Another alternative was nickel extraction by LIX 84, cobalt having remained in the liquor, which could be precipitated using hydrosulphide.

This sample was leached under the conditions for ex. 5.

It was found that nickel recovery was similar to that from the standard leaching (77.1%) and that cobalt recovery increased up to 61.5%.

What is claimed is:

1. A hydrometallurgical process for nickel and cobalt recovery by the intensive leaching of a material including one selected from ores, concentrates, and intermediate products, comprising the following steps:

a. reducing a material comprising 0.5–3.0 wt. % nickel, 0.005–1.5 wt. % cobalt, and 10–55 wt. % iron at a temperature range between 540–850° C., using a reducing agent;

wherein the material is one selected from a nickel ferrous ore, an intermediate product and a nickel and cobalt concentrate, and wherein the Ni and Co metals are soluble in ammonia solutions and wherein a previous reduction is not necessary, b. cooling the reduced material in the presence of reducing or inert gases;

c. contacting the cooled, reduced material with one selected from an ammonia-ammonium carbonate and ammonia-ammonium sulfate solution comprising a 0.5–3.0 wt. % solution to form a pulp such that the temperature of the pulp does not exceed 60° C.; and d. leaching the pulp in a tubular reactor, wherein air or an oxidizing gas is injected over a leaching time between 5 seconds and 15 minutes, with oxygen adsorption.

2. The process of claim 1, wherein step (a) the reducing agent comprises petroleum which is added in one selected from a ball mill, a mixer for petroleum and a mineral, and injected directly to a hearth or story of a reduction furnace.

3. The process of claim 2, which further comprises reducing the mineral to a ground of $-74\,\mu m$ by one selected from a reducing gas with 2–50 vol. % comprising CO and $H_2$, by a mixture of a reducing gas and the petroleum, and the petroleum alone as reducing agent for about 5–90 minutes.

4. The process of claim 1, wherein step (b) the reduced material is cooled up to a temperature of 130–280° C.

5. The process of claim 1, wherein step (c) further comprises the mineral is brought into contact with an ammonia carbonate solution, wherein the pulp has a density of 1050–1250 g/L.

6. The process of claim 1, further comprising passing the pulp through the tubular reactor at a rate of 0.5 m/s–29 m/s, and the air or the oxidizing gas, between 0.25 m/s and 15 m/s, rendering an oxygen absorption efficiency of 30–90 vol. %.

7. A process of claim 1, further comprising at least one additional step selected from the additional steps consisting of:

(a) leaching the pulp in turbo aerators and liquid/solid separation equipment;

(b) flash liquid/solid separating the pulp in means including hydroclones and a thickener, thereby reducing the liquor-solid contact time, to a pulp density of 40–60 wt. % solids;

(c) reextracting and washing in a tubular reactor of 0.5–10 wt. % nickel and 2–25 wt. % cobalt contained in the pulp for 0.5–20 minutes;

(d) washing in a tubular reactor of the ammonia contained in the pulp for 0.5–20 minutes;

(e) separating the nickel and cobalt from the pregnant liquor by extraction with a solvent selective for cobalt or nickel in order to obtain a respective product with a Co:Ni or Ni:Co ratio≧400:1;

(f) separating the nickel and cobalt using an ion-exchange resin with $HSO_2$ functional groups through various countercurrent stages with an efficiency of 99.5%; and (g) separating 40–95 wt. % of cobalt with a Ni:Co ratio from 2:1 to 4:1 by one selected from ammonium hydrosulphide, $H_2S$ and $Na_2S$.

8. The process of claim 2, further comprising at least one of additional steps selected from the additional steps comprising of:

(a) leaching the pulp in turbo aerators and liquid/solid separation equipment;

(b) flash liquid/solid separating the pulp in equipment means including hydroclones and a thickener, thereby reducing the liquor-solid contact time, to a pulp density of 40–60 wt. % solids;

(c) reextracting and washing in a tubular reactor of 0.5–10 wt. % nickel and 2–25 wt. % cobalt contained in the solid for 0.5–20 minutes;

(d) washing in a tubular reactor of the ammonia contained in the pulp for 0.5–20 minutes;

(e) separating the nickel and cobalt from the pregnant liquor by extraction with a solvent selective for cobalt or nickel in order to obtain a respective product with a Co:Ni or Ni:Co ratio≧400:1;

(f) separating the nickel and cobalt using an ion-exchange resin with $HSO_2$ functional groups through various countercurrent stages with an efficiency of 99.5%; and (g) separating 40–95 wt. % of cobalt with a Ni:Co ratio from 2:1 to 4:1 by one selected from ammonium hydrosulphide, $H_2S$, and $Na_2S$.

9. The process of claim 3, further comprising at least one of additional steps selected from the additional steps comprising of:

(a) leaching the pulp in turbo aerators and liquid/solid separation equipment;

(b) flash liquid/solid separating the pulp in equipment means including hydroclones and a thickener, thereby reducing the liquor-solid contact time, to a pulp density of 40–60 wt. % solids;

(c) reextracting and washing in a tubular reactor of 0.5–10 wt. % nickel and 2–25 wt. % cobalt contained in the solid for 0.5–20 minutes;

(d) washing in a tubular reactor of the ammonia contained in the pulp for 0.5–20 minutes;

(e) separating the nickel and cobalt from the pregnant liquor by extraction with a solvent selective for cobalt or nickel in order to obtain a respective product with a Co:Ni or Ni:Co ratio≧400:1;

(f) separating the nickel and cobalt using an ion-exchange resin with $HSO_2$ functional groups through various countercurrent stages with an efficiency of 99.5%; and (g) separating 40–95 wt % of cobalt with a Ni:Co ratio from 2:1 to 4:1 by one selected from ammonium hydrosulphide, $H_2S$, and $Na_2S$.

10. The process of claim 4, further comprising at least one of additional steps selected from the additional steps comprising of:

(a) leaching the pulp in turbo aerators and liquid/solid separation equipment;

(b) flash liquid/solid separating the pulp in equipment means including hydroclones and a thickener, thereby reducing the liquor-solid contact time, to a pulp density of 40–60 wt. % solids;

(c) reextracting and washing in a tubular reactor of 0.5–10 wt. % nickel and 2–25 wt. % cobalt contained in the solid for 0.5–20 minutes;

(d) washing in a tubular reactor of the ammonia contained in the pulp for 0.5–20 minutes;

(e) separating the nickel and cobalt from the pregnant liquor by extraction with a solvent selective for cobalt or nickel in order to obtain a respective product with a Co:Ni or Ni:Co ratio≧400:1;

(f) separating the nickel and cobalt using an ion-exchange resin with $HSO_2$ functional groups through various countercurrent stages with an efficiency of 99.5%; and (g) separating 40–95 wt.-% of cobalt with a Ni:Co ratio from 2:1 to 4:1 by one selected from ammonium hydrosulphide, $H_2S$, and $Na_2S$.

11. The process of claim 5, further comprising at least one of additional steps selected from the additional steps comprising of:

(a) leaching the pulp in turbo aerators and liquid/solid separation equipment;

(b) flash liquid/solid separating the pulp in equipment means including hydroclones and a thickener, thereby reducing the liquor-solid contact time, to a pulp density of 40–60 wt. % solids;

(c) reextracting and washing in a tubular reactor of 0.5–10 wt. % nickel and 2–25 wt. % cobalt contained in the solid for 0.5–20 minutes;

(d) washing in a tubular reactor of the ammonia contained in the pulp for 0.5–20 minutes;

(e) separating the nickel and cobalt from the pregnant liquor by extraction with a solvent selective for cobalt or nickel in order to obtain a respective product with a Co:Ni or Ni:Co ratio≧400:1;

(f) separating the nickel and cobalt using an ion-exchange resin with $HSO_2$ functional groups through various countercurrent stages with an efficiency of 99.5%; and (g) separating 40–95 wt. % of cobalt with a Ni:Co ratio from 2:1 to 4:1 by one selected from ammonium hydrosulphide, $H_2S$, and $Na_2S$.

12. The process of claim 6, further comprising at least one of additional steps selected from the additional steps comprising of:

(a) leaching the pulp in turbo aerators and liquid/solid separation equipment;

(b) flash liquid/solid separating the pulp in equipment means including hydroclones and a thickener, thereby reducing the liquor-solid contact time, to a pulp density of 40–60 wt. % solids;

(c) reextracting and washing in a tubular reactor of 0.5–10 wt. % nickel and 2–25 wt. % cobalt contained in the solid for 0.5–20 minutes;

(d) washing in a tubular reactor of the ammonia contained in the pulp for 0.5–20 minutes;

(e) separating the nickel and cobalt from the pregnant liquor by extraction with a solvent selective for cobalt or nickel in order to obtain a respective product with a Co:Ni or Ni:Co ratio≧400:1;

(f) separating the nickel and cobalt using an ion-exchange resin with $HSO_2$ functional groups through various countercurrent stages with an efficiency of 99.5%; and (g) separating 40–95 wt. % of cobalt with a Ni:Co ratio from 2:1 to 4:1 by one selected from ammonium hydrosulphide, $H_2S$, and $Na_2S$.

13. The process according to claim 1, where the pressure is 1.5 to 10.0 bar at the inlet of the tubular reactor.

14. The process according to claim 2, where the pressure is 1.5 to 10.0 bar at the inlet of the tubular reactor.

15. The process according to claim 3, where the pressure is 1.5 to 10.0 bar at the inlet of the tubular reactor.

16. The process according to claim 4, where the pressure is 1.5 to 10.0 bar at the inlet of the tubular reactor.

17. The process according to claim 5, where the pressure is 1.5 to 10.0 bar at the inlet of the tubular reactor.

18. The process according to claim 6, where the pressure is 1.5 to 10.0 bar at the inlet of the tubular reactor.

19. The process according to claim 7, where the pressure is 1.5 to 10.0 bar at the inlet of the tubular reactor.

20. The process of claim 1, further comprising cooling the leached pulp in the tubular reactor so that the temperature increases no more than 1 to 6° C.

\* \* \* \* \*